United States Patent
Bauer et al.

[11] Patent Number: 6,109,693
[45] Date of Patent: Aug. 29, 2000

[54] MOTOR VEHICLE SEAT WITH A SEAT SUPPORT WITH A DEVICE FOR THE ADJUSTMENT OF THE SEAT DEPTH

[76] Inventors: Heinz Bauer, Hammerstr. 9, D-42699, Solingen; Burckhard Becker, Obenkatternberg 25, D-42655, Solingen; Ernst-Reiner Frohnhaus, Hammerstr. 13, D-42699, Solingen, all of Germany

[21] Appl. No.: 08/965,210

[22] Filed: Nov. 6, 1997

[30] Foreign Application Priority Data

Nov. 7, 1996 [DE] Germany ............... 196 45 772

[51] Int. Cl.[7] ............... A47C 3/025; A47C 7/14
[52] U.S. Cl. ............... 297/284.11; 297/284.1; 297/284.3; 297/284.8
[58] Field of Search ............... 297/284.11, 284.1, 297/284.3, 284.8

[56] References Cited

U.S. PATENT DOCUMENTS

| | | | |
|---|---|---|---|
| 3,057,660 | 10/1962 | Schneider | 297/284.3 X |
| 3,550,953 | 12/1970 | Neale | 297/284.11 X |
| 4,324,431 | 4/1982 | Murphy et al. | 297/284.11 |
| 4,334,709 | 6/1982 | Akiyama et al. | 297/284.11 |
| 4,491,365 | 1/1985 | Murakami | 297/284.11 |
| 4,583,781 | 4/1986 | Hatsutta et al. | 297/284.11 |
| 4,636,002 | 1/1987 | Genjiro | 297/284.11 X |
| 4,682,763 | 7/1987 | Kazaoka et al. | 297/284.11 X |
| 4,709,961 | 12/1987 | Hill | 297/284.11 |
| 4,720,141 | 1/1988 | Sakamoto et al. | 297/284.11 |
| 4,753,479 | 6/1988 | Hatsutta et al. | 297/284.11 |
| 4,915,447 | 4/1990 | Shovar | 297/284.11 |
| 5,120,109 | 6/1992 | Rangoni | 297/284.3 |

FOREIGN PATENT DOCUMENTS 58-36732  3/1983  Japan ............... 297/284.11

*Primary Examiner*—Peter M. Cuomo
*Assistant Examiner*—Rodney B. White
*Attorney, Agent, or Firm*—John Lezdey & Assoc

[57] ABSTRACT

There is provided a motor vehicle seat with a seat support, which is constructed of two sections, namely of a front part and of a back part, which are connected with each other via two side connecting areas and that for an adjustment of the seat depth, the side connecting areas each have a long hole, into which an axle pin is led and that a device exists for the mechanical adjustment and fixation of the two sections in opposition to each other.

6 Claims, 1 Drawing Sheet

MOTOR VEHICLE SEAT WITH A SEAT SUPPORT WITH A DEVICE FOR THE ADJUSTMENT OF THE SEAT DEPTH

BACKGROUND OF THE INVENTION

1. Field of the Invention

The invention relates to a motor vehicle seat with a seat support, which is constructed of two sections, namely of a front part and of a back part, which are connected with each other via two side connecting areas.

Such a motor vehicle seat is known from the DE 36 24 398 C2. With this known seat, the seat support consists of a frame-shape part and a swiveling bridge, which is hinged to it. The two side connecting areas between the frame-shape part and the swiveling bridge are embodied as hinges. The seat support is carried by an underframe, for example via front and back parallelogram brackets of a device for the height adjustment or via seat carriers of a longitudinal adjustment device by means of an in-line arrangement of an adjustment device for the height of the front edge of the seat.

By adjusting the swiveling bridge in opposition to the support part, a height adjustment of the front edge of the seat is achieved. Such a height adjustment of the front edge of the seat is also possible and desired with the motor vehicle seat according to the invention.

2. Description of the Proir Art

With the motor vehicle seat known from the DE 30 01 429 A1, the seat support is constructed of two sections, which carry an upholstery object each. They are called back pillow and front pillow. The front pillow is connected to the back pillow via a device for the adjustment of the seat depth. Due to that the distance between the two upholstery objects can be altered. With this solution, a channel occurs between the two upholstery objects, if the seat depth of the motor vehicle seat is enlarged based on the lowest depth of the seat area. This channel is getting bigger with the progressing adjustment of the seat depth. This is a disadvantage, because it is possible for objects, which may hinder a later re-adjustment, to accumulate between the two upholstery objects, and also because a section of the thigh of the user of the seat stays without a support and a rest.

SUMMARY OF THE INVENTION

This is where the invention starts. It is the task of the invention to further develop a motor vehicle seat of the above mentioned kind in such a way that an adjustment of the seat depth is made possible with simple means, whereby a solution is to be avoided, with which a visible channel occurs between the individual sections of the seat support or its upholstery.

Based on the motor vehicle seat of the above mentioned kind this task is solved in such a way that for the adjustment of the seat depth, the side connecting areas have a long hole each, into which a pin is lead each and that a device exists for the mechanical adjustment and fixation of the two sections in opposition to each other.

With this motor vehicle seat the seat support is operated manually or in a motor driven way, lengthened and shortened, the movement of the adjustment occurs via a device for the adjustment of the seat depth, which effects a mechanical adjustment and fixation of the two sections in opposition to each other. An already known adjustment device is taken into consideration as such a device, which effects directly between the two sections of the seat support, for example a device with a spindle/spindle nut or a steering rack/pinion. It is also possible, however, to realize the device for the adjustment of the seat depth by means of the underframe, for example by changing the distance of a front and back support point of the seat support on a seat carrier of a longitudinal adjustment device.

The invention makes it possible to use an upholstery object, which has a continues cover. Channels, which are visible on the outside, do not occur. Thereby it has proven to be especially advantageous to either use an elastic material or to collect the material used as a covering material as a pad, which is positioned in the area below or next to the backrest and which is optically covered as far as possible and which is essentially used up in the stretched position of the seat support.

In a special preferred embodiment of the invention the connecting areas are embodied as hinges, the pin is embodied as an axle pin. It is not only possible to change the length of the seat support in such a way, but also the two sections can be angularity displaced in opposition to each other in an independent manner from the longitudinal adjustment, therefore, the height of the front edge of the seat support can also be adjusted.

In a special preferred embodiment of the invention the two seat supports are connected with each other via tension springs, which run crosswise to the direction of the swiveling axis of the axial pins in the long holes. The device for the adjustment of the seat depth works against the force of these tension springs, if the depth of the seat is supposed to be enlarged. In a preferred embodiment the tension springs take over the function of the springs of the seat upholstery, at least in a section of their total length.

In a further preferred embodiment the tension springs are divided in a back area of the spring, which engages at the back part and a front area of the spring, which engages at the front part. Different tasks can be allocated to these two areas of the spring. So, the front area of the spring can be used for the seat upholstery, while the back area of the spring is responsible for the stretching of the cover of the seat upholstery. This back area of the spring can be hidden in the already mentioned pad, which takes up a surplus of the cover material, when the seat support is in its short adjustment position. The pad is deconstructed together with the spring, the spring is pressed flat or lengthened otherwise, if the seat support is put into its position, which is driven further.

Insofar it is advantageous, if the back area of the spring is embodied for a longitudinal alteration, which corresponds to the adjusting area of the adjustment of the seat depth.

In a preferred practical embodiment, the two areas of the spring consist of each of several individual springs arranged next to each other. Preferably each individual spring of the one area of the spring is allocated to an individual spring of the other area of the spring. These individual springs can also blend into each other in one piece, whereby only the special bent and embodiment of the spring makes it possible to recognize, which part is responsible for which area of the spring. That way, the individual springs of the front area of the spring will be essentially embodied going back and forth, for example in a zigzag manner or in a rectangular way, where else the individual spring of the back area of the spring is preferably V-shaped, whereby the V-shape squaring is stretched crosswise to the seat surface of the seat support.

It is preferred to provide a transverse part, onto which the individual springs of the front as well as the individual springs of the back area engage. That way a precise separation between the individual spring areas is possible. Especially the function of the spring areas is clearly separated, namely the allocation of the individual springs of the front area of the spring for the seat upholstery and the allocation of the individual springs of the back area of the spring for the longitudinal alteration of the upholstery object.

Hereby it has proven to be advantageous furthermore to provide the transverse part with two side legs, which are arranged at their loose ends at the front part. They can be hinged at their axle pins or in the vicinity of the same, as long as these are allocated to the front part. That way, a longitudinal alteration of the seat support has only an effect on the springs of the back area of the spring. The spring system of the seat upholstery stays unaffected by the respective length, to which the seat support is adjusted.

BRIEF DESCRIPTION OF THE PREFERRED DRAWINGS

Further advantages and characteristics of the invention derive from the other claims as well as the following description of a non-restrictive embodiment of the invention, which is illustrated further with regard to the illustration. This illustration shows in:

FIG. 1: a perspective illustration of a seat support for a motor vehicle seat according to the invention and FIG. 2: a side view of a schematic illustration of a motor vehicle seat with such a seat support, but in an altered embodiment of the seat support in comparison to FIG. 1.

DESCRIPTION OF THE PREFERRED EMBODIMENTS

Figure 1:
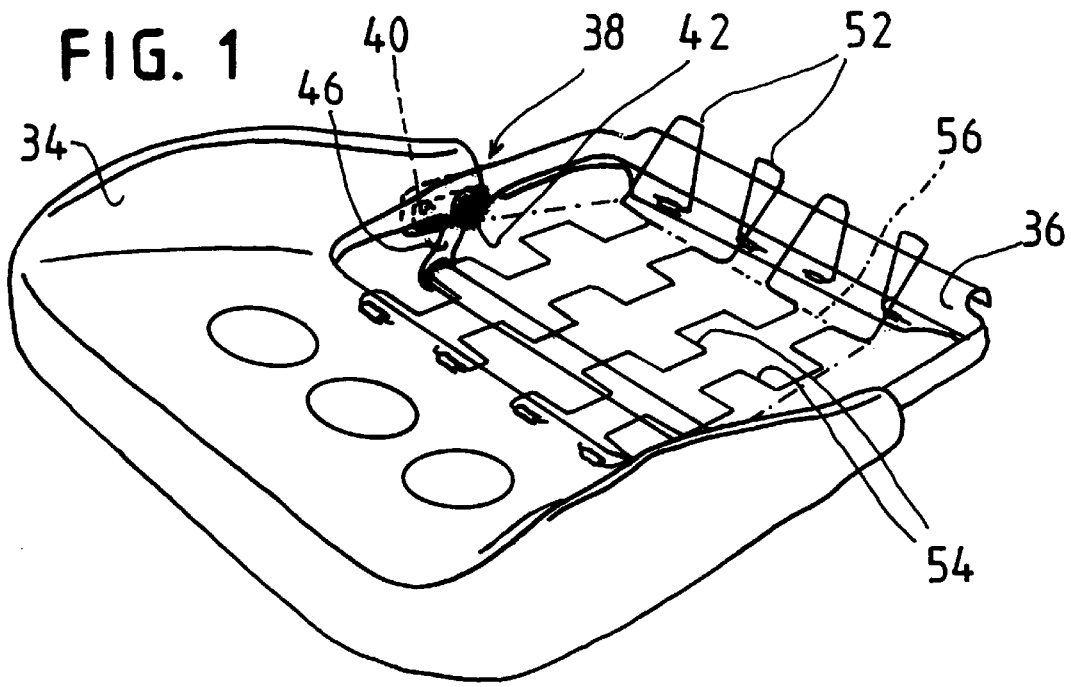

As can be seen from the figures, the known motor vehicle seat has a seat support 20, which is connected via an underframe with an understructure of the body 22 of a motor vehicle. A longitudinal guide with a bottom carrier 24 and a seat carrier 26 belong to the underframe, a pair of these carriers normally exists on each side of the seat. The seat carrier 26 is connected to the seat support 20 via a back parallelogram bracket 28, at the front it is hinged with the seat support 20 via a front parallelogram bracket 30 and via a pair of articulated levers 32.

Figure 2:
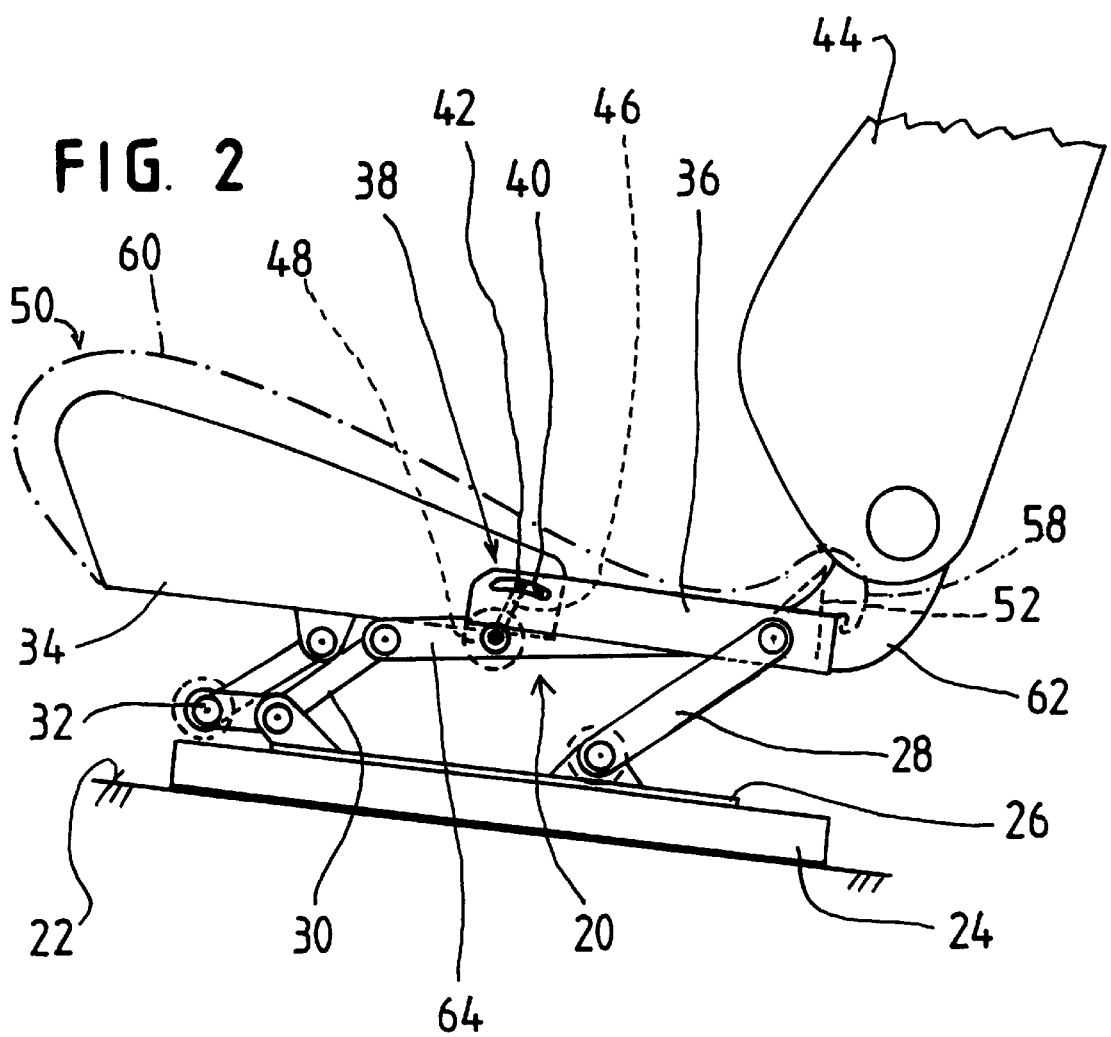

The seat support is constructed of two sections, namely a front part 34 and a back part 36. The two parallelogram brackets 28, 30 are hinged at the back part, at the front part 34 the top hinge point of the pair of articulated levers 32 engages. To this pair of articulated levers 32, an angular adjustment device is allocated, as already known from the state of the art, as for example an eccentric device. In FIG. 2 such a device is illustrated in a dotted line, it is arranged at the mutual hinge. Also in one of the parallelogram brackets (in FIG. 2 at the bracket 28 at the bottom), a respective adjustment device, as known from the state of the art, is allocated.

Front part 34 and back part 36 are connected with each other via two side connecting areas 38, which are basically embodied as hinge areas in the embodiments. The hinge areas 38 are positioned opposite each other and they are arranged in the side area of the seat support, at about the area of the center seen from the longitudinal direction. Each hinge area consists of a long hole 40 and a rotary axis, which is embodied as a round axle pin 42 in the embodiments, which can be guided in the long hole on a two dimensional curve, which runs in a bent or in a continuos line. Independent from each other, either the total length of the seat support 20 can be altered or also the front part 34 can be displaced angularity in opposition to the back part 36 due to the hinge areas 38. Both adjustments are only possible within dictated limitations. The area of the adjustment derives from the loose length of the long hole. the area of angular adjustment between the two parts 34, 36 is typically positioned below 30 degrees, mostly it is even smaller than 20 degrees.

For the longitudinal adjustment of the seat support 20 a device of a suitable kind is provided, an embodiment of such kind is illustrated in the FIGS. 1 and 2, but other embodiments are also possible. According to the embodiment shown, at the back side areas of the front part 34, namely those pointing the farthest to the backrest 44, an axle pin 42 is mounted, which each engages into the long hole 40, which is formed in the back part 36. A swiveling bridge 46 is connected with both axle pins 42, it consists of two side brackets, essentially pointing downwards and a lever running crosswise. An adjustment device 48 is connected with the back part 36, such device can also be executed as an eccentric adjustment, as it is known for example for the angular adjustment of the backrests. By means of it, the lever of the swiveling bridge 46 is slightly rotated, which leads to a displacement of the axle pins 42 in the long holes 40 and thereby to a longitudinal adjustment of the seat support 20. The height of a front edge of a seat 50 is adjusted by adjusting the pair of articulated levers 32 via the already mentioned angular adjustment device.

Front part 34 and back part 36 are connected with each other via tension springs, four such tension springs are illustrated in FIG. 1. They each consist of a back area of the spring 52, which engages at a base of the essentially u-shape back part 36, and a front area of the spring 54, which is also hinged at the base of the front part 34. The back areas of the spring 52 are laid out in such a way that they can take up the alteration of the length of the seat support 20. The front areas of the spring 54 are designated for the seat upholstery.

To make sure that the functions of the two areas of the spring 52, 54 can be clearly separated, a transverse part 56, at which all back areas of the spring 52 and all front areas of the spring 54 engage, is provided in a preferred embodiment in FIG. 1 in a dotted line. This transverse part 56 makes it possible to choose the numbers of springs of the back area of the spring in an uneven number to the numbers of springs of the front area of the spring. Furthermore, it is achieved by the transverse part 56, that the transfer between the back and the front area of the springs stay essentially on the line of the transverse part 56. Finally in a preferred embodiment, the transverse part, as illustrated in FIG. 1, has side legs, with which it has a fixed position at both sides at the front part 34, in the embodiment shown slightly below the axle pins 42. This connection may be rigid, occurring for example by welding, if the transverse part 56 has a certain flexibility. The transverse part 56 is therefore preferably made of a rigid wire, for example a diameter of 2 mm. In another embodiment, the loose ends of the side legs can be kept in a rotary manner around the axle pins 42. Due to the transverse part 56, a longitudinal adjustment of the seat support 20 has only an effect on the back area of the spring 52, but not on the front area of the spring 54.

While the front areas of the spring 54 run essentially in the main level of the seat support 20 and follow a rectangular curve in the embodiment, the back areas of the spring 54, which are bent in a v-shape manner, protrude upwards, crosswise to the main level of the seat support 20. They are positioned within a pad 58, as can be seen from FIG. 2. In FIG. 2 the cover material 60 for the seat surface of the motor vehicle seat is illustrated in a dotted line. It runs continuously without forming any channels, from the front to the back. It also limits the pad 58 to the outside, as illustrated in FIG. 2.

The pad 58 contains the supply for the cover material, which is needed to equalize the longitudinal alterations of the seat support. With the progressing length of the seat support 20, the pad 58 becomes flatter, and correspondingly also the back areas of the spring 52 are more strongly taken in squaring and thereby the distance of the transverse part 56 of the basis of the back part 36 becomes longer. Expressed differently, the back areas of the spring 52 become flatter. With a seat support 20, driven out the most, the pad 58 is relatively flat. It has its largest height, when the seat support 20 has its shortest total length. The pad 58 is arranged, possibly hidden, below or in the vicinity of a lower area of the backrest 44, so that it does not disturb in the normal seating situation. Because of the pad 58 one can successfully use a continues cover material 60 for the seat support 20, having a longitudinal alteration. The cover material does not have to be of an elastic material.

The seat support 20 can be upholstered. It can, as illustrated in FIG. 2, take over the support function for the seating area, but it can also be carried in a separate support structure, which is then connected with the already described underframe.

As illustrated in FIG. 2, the backrest 44 is carried directly by the back part 36 in the embodiment shown. Hereby side support flanges 62 for the backrest 44 are connected in a rigid way with the back part. At each side, a bracket 64 each is connected with the back part 36 for the taking up of the upper hinge of a front parallelogram bracket 30 and the holding device of the adjustment device of the swiveling bridge 46.

What is claimed is:

1. A motor vehicle seat having a seat support comprising:
   a front part a back part, two side connecting areas, and axle pins;
   said front part and said back part are connected to each other by said side connecting areas;
   each said side connecting area further having a long hole;
   said axle pins being led through said long holes wherein a longitudinal adjustment of the seat support and the seat depth is adjusted; and
   a means to mechanically adjust and fix said front part in opposition to said back part, providing displacement of the axle pins in the long holes and thereby a longitudinal adjustment of the seat support;
   a backrest connected to said seat support;
   tension springs, wherein the front part and the back part of said seat support are connected by said tension springs that run essentially crosswise to said backrest;
   said tension springs further comprising a back area and a front area, said back area engaged at said back part and said front area engaged at said front part;
   the front part having a seat pillow, a seat pillow pad, and V-shaped individual springs, wherein a back area of the V-shaped springs is positioned behind said pad of the seat pillow.

2. The motor vehicle seat according to claim 1 further comprising a transverse part, wherein said front area and back area of the spring each is comprised of a plurality of individual springs, said individual springs being arranged in a line, and said individual springs of the front area and of the back area of the spring engage onto said transverse part.

3. The motor vehicle seat according to claim 2 whereine said transverse part is further comprised of two side legs having a front part and a loose end, said side legs being hinged, at said front part with said loose ends, and said side legs being further arranged in such a way that they withstand tensile stress and resistance to pressure.

4. The motor vehicle seat according to claim 1 further comprising an elastic bedding for dampening, wherein said elastic bedding is proximate to said long holes and said axle pin is between said long hole and said axle pin.

5. The motor vehicle seat according claim 1 further comprising a backrest and a continually covering seat upholstery, said upholstery having a prolonged area, and said upholstery running across the front part to the back part and that in an area below said backrest of the motor vehicle seat said prolonged area is embodied as said seat pillow pad.

6. A motor vehicle seat having a seat support comprising:
   a front part having a seat pillow and a seat pillow pad, a back part, two side connecting areas, and axle pins; said seat pillow pad having V-shaped individual springs, a front area of said springs being constructed for an upholstery of said seat pillow;
   said front part and said back part are connected to each other by said side connecting areas;
   each said side connecting area further having a long hole;
   said axle pins being led through said long holes wherein a longitudinal adjustment of the seat support and the seat depth is adjusted; and
   a means to mechanically adjust and fix said front part in opposition to said back part providing displacement of the axle pins in the long holes and thereby a longitudinal adjustment of the seat support;
   a backrest connected to said seat support;
   tension springs, wherein the front part and the back part of the seat support are connected by said tension springs that run essentially crosswise to said backrest;
   said tension springs further comprising a back area and a front area, said back area engaged at said back part and said front area engaged at said front part
   said tension springs including said V-shaped individual springs, wherein a back area of said V-shaped springs is positioned behind said pad of the seat pillow.

* * * * *